(12) United States Patent
Brannan (10) Patent No.: US 11,480,804 B2
(45) Date of Patent: Oct. 25, 2022

(54) DISTRIBUTED FOVEATED RENDERING BASED ON USER GAZE (71) Applicant: Tobii AB, Danderyd (SE)

(72) Inventor: Ritchie Brannan, Danderyd (SE)

(73) Assignee: TOBII AB, Danderyd (SE)

( * ) Notice: Subject to any disclaimer, the term of this patent is extended or adjusted under 35 U.S.C. 154(b) by 0 days.

(21) Appl. No.: 17/261,799

(22) PCT Filed: Jul. 20, 2019

(86) PCT No.: PCT/IB2019/001287
§ 371 (c)(1),
(2) Date: Jan. 20, 2021

(87) PCT Pub. No.: WO2020/141344
PCT Pub. Date: Jul. 9, 2020

(65) Prior Publication Data
US 2021/0278678 A1 Sep. 9, 2021

Related U.S. Application Data (60) Provisional application No. 62/701,015, filed on Jul. 20, 2018.

(51) Int. Cl.
G02B 27/01 (2006.01)
G02B 27/00 (2006.01)
(Continued)

(52) U.S. Cl.
CPC ..... *G02B 27/0179* (2013.01); *G02B 27/0093* (2013.01); *G02B 27/017* (2013.01);
(Continued)

(58) Field of Classification Search
CPC ........ G02B 2027/0187; G02B 27/0093; G02B 27/017; G02B 27/0179; G06F 3/013; G06T 3/40
See application file for complete search history.

(56) References Cited

U.S. PATENT DOCUMENTS 9,779,478 B1 * 10/2017 Wilson ................. G06T 3/4092
10,712,817 B1 * 7/2020 Rönngren ............ G02B 27/017
(Continued)

FOREIGN PATENT DOCUMENTS

WO 2018/055332 3/2018

OTHER PUBLICATIONS

International Search Report and Written Opinion of PCT/IB2019/001287.

*Primary Examiner* — Dmitriy Bolotin
(74) *Attorney, Agent, or Firm* — Kilpatrick Townsend & Stockton LLP (57) ABSTRACT Techniques for distributed foveated rendering based on user gaze are described. In an example, an end user device is communicatively coupled with a remote computer and presents images on a display based on gaze data. The user device receives a low resolution background image and high resolution foreground image from the remote computer based on the gaze data. The foreground image is constrained to a foveated region according to the gaze data. The end user device generates a composite image by scaling up the background image and overlaying the foreground image. The composite image is then presented on the display.

18 Claims, 8 Drawing Sheets (51) Int. Cl.
*G06F 3/01* (2006.01)
*G06T 3/40* (2006.01)

(52) U.S. Cl.
CPC .............. *G06F 3/013* (2013.01); *G06T 3/40* (2013.01); *G02B 2027/0187* (2013.01)

(56) References Cited

U.S. PATENT DOCUMENTS

| | | | |
|---|---|---|---|
| 10,885,882 B2* | 1/2021 | Nijs | G06T 5/002 |
| 2013/0335442 A1* | 12/2013 | Fleck | G09G 3/003 |
| | | | 345/629 |
| 2017/0115488 A1* | 4/2017 | Ambrus | G06T 19/006 |
| 2018/0033405 A1* | 2/2018 | Tall | G06F 3/147 |
| 2018/0276824 A1* | 9/2018 | Haraden | G09G 3/003 |
| 2020/0035206 A1* | 1/2020 | Hamaker | G06F 3/011 |
| 2020/0184933 A1* | 6/2020 | Nijs | G06T 5/002 |
| 2020/0319455 A1* | 10/2020 | Cummings | G06T 19/006 |
| 2021/0278678 A1* | 9/2021 | Brannan | G06T 3/40 |
| 2022/0011858 A1* | 1/2022 | Li | G06F 3/013 |

* cited by examiner

DISTRIBUTED FOVEATED RENDERING BASED ON USER GAZE

BACKGROUND

Interaction with computing devices is a fundamental action in today's world. Computing devices, such as personal computers, tablets, and smartphones, are found throughout daily life. In addition, computing devices that are wearable, such as wearable headset devices (e.g., virtual reality headsets and augmented reality headsets), are becoming increasingly popular. The systems and methods for interacting with such devices define how they are used and what they are used for.

Advances in eye tracking technology have made it possible to interact with a computing device using a person's gaze information, such as the position on a display the user is gazing at. This information can be used for interaction solely, or in combination with a contact-based interaction technique (e.g., using a user input device, such as a keyboard, a mouse, a touch screen, or another input/output interface).

Previously proposed interaction techniques using gaze information can be found in U.S. Pat. No. 6,204,828, United States Patent Application Publication 2013/0169560, U.S. Pat. No. 7,113,170, United States Patent Application Publication 2014/0247232, and U.S. Pat. No. 9,619,020. The full specification of these patents and applications are herein incorporated by reference.

Furthermore, foveated rendering is possible based on the eye tracking technology. Generally, foveated rendering is a technique for reducing the computational burden of presenting content on a display. According to this technique, content where the user is gazing is rendered at a higher resolution relative to other content also rendered on the display. In this way, the rendering workload is significantly alleviated by reducing the content quality in the peripheral vision (outside of the zone gazed by the user's fovea). Wearable headset devices, such as virtual reality headsets, and other computing devices can take advantage of the foveated region to reduce the computational burden associated with content presentation, thereby saving power.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

SUMMARY

Embodiments for distributed foveated rendering are disclosed. In an example, an end user device is communicatively coupled with a remote computer over a data network and presents images on a display based on user gaze. The end user device receives, from the remote computer, a background image and a foreground image. The background image has a lower resolution than the foreground image and has first dimensions that are smaller than an image display region of the display. The foreground image has second dimensions that are equal to a foveated region located within the image display region. The end user device generates a composite image by scaling up the background image to the image display region and by overlaying the foreground image based on gaze data of a user of the end user device. Thereafter, the end user device can warp the composite image and presents the composite image (e.g., the warped composite image when the warping is performed) in the image display region of the display, thereby supporting foveated rendering that is distributed between the end user device and the remote computer.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

DETAILED DESCRIPTION

Embodiments of the present disclosure relate to distributed foveated rendering based on user gaze. In an example, a computer system includes an end user device and a remote computer, such as a virtual reality headset and a host computer, that are communicatively coupled over a data network. The end user device presents images on an image display region of a display (e.g., video content in a graphical user interface). Foveated rendering is distributed between these components of the computer system.

In particular, the end user device sends gaze data and orientation data to the remote computer. The gaze data corresponds to a gaze of a user on the display. The orientation data corresponds to an orientation of the end user device or the display in the physical environment. In response, the end user device receives a low resolution background image and a high resolution foreground image from the remote computer. The foreground image corresponds to a foveated region that contains the location of the user gaze on the display. In an example, "a low resolution background image" refers to an image that has a low resolution, such as a low pixel density, and that should be presented in the background. "A high resolution foreground image" refers to an image that has a high resolution, such as a high pixel density, and that should be presented in the foreground. The terms "low" and "high" are used relative to each other, where a "low resolution" refers to a resolution (e.g., a pixel density) that is lower than a "high resolution." The end user device generates a composite image from these two images and, as needed to compensate for lens distortion, warps the composite image. In addition, the end user device can reduce artefacts based on a brightness comparison between pixels of the two images and can blend the overlapping boundaries of the two images. The final image (e.g., the composite image that is warped, artifact-processed, and boundary-blended as applicable) is presented in the image display region of the display. Accordingly, the foveated region is distributed between the end user device and the remote computer.

Accordingly, image and supporting data is split into a high pixel density foveal region and a reduced pixel density background. The positioning of the foveal region within the full image is dictated by a gaze point obtained from an eye tracker associated with the end user device (e.g., integrated therewith). The background data represents either the entire scene to be displayed or includes over-scan data to allow temporal warping to account for latent head movement (e.g., when the end user device is a head mounted device). The foveal data represents the section of the image where the eye(s) will have the greatest acuity together with expansion of the area to allow some tolerance for latency in the tracking and display.

In an example, the remote computer typically generates the image data as two rectangular areas as this is the standard form that common rasterization hardware works with. To further reduce data bandwidth between the remote computer and the end user device, the data to be transferred optionally undergoes further reduction including elimination of the redundant data in the background which will be obscured by the foveal region, clipping less visually important areas of the foveal region (for instance clipping to an oval, octagonal or hexagonal shape), and reducing the color accuracy of the background image. The total amount of data reduction can be controlled by, for instance, adjusting the pixel density of the background image, the size of the foveal region, and by applying some or all of the optional additional data reduction. The image and supporting data together with a description of the position of the foveal region is transferred from the remote computer to the end user device. The data transferred to the end user device is not limited to image data and may include needed data for standard per-pixel temporal processing such as re-projection, anti-aliasing, and temporal up-scaling. The end user device will composite the foveal region over the background image and apply any needed additional optional processing (temporal processing and image filtering) to generate the final full image to be displayed.

Relative to existing foveated rendering local to a device, the embodiments of the present disclosure provide significant improvements. For example, processing and memory usage of the end user device are reduced by outsourcing the generation of image data, including the rendering of the background and foreground images, to the remote computer. In turn, this reduction decreases battery usage of the end user device.

Furthermore, the embodiments of the present disclosure optimize computing resource usage by intelligently distributing the foveated rendering between the user device and the remote computer. For example, processing load of the remote computer, bandwidth usage, processing latency, and unwanted artefacts are reduced. In particular, the processing load is reduced by reducing the number of pixels which the remote computer needs to process, by transferring some common processing to the end user device, and optionally by allowing the end user device to generate additional intermediate frames using temporal re-projection techniques. In addition, the transmission of image data to the end user device over a data network uses less bandwidth than transmitting the final image instead, which would be the case of outsourcing most of the processing to the remote computer. More specifically, the bandwidth is reduced by transferring less pixel data and optionally by amortizing the data transfer over multiple frames using temporal re-projection techniques for intermediate frames. In addition, because only the low resolution background and high resolution foreground images need to be rendered by the remote computer, the latency between the end user device transmitting the gaze and orientation data and receiving these images is significantly less than what the latency would be if most of the processing were instead outsourced to the remote computer. With the shorter latency, the end user device can complete the processing and present the final image based on relatively more up-to-date gaze and orientation data, thereby reducing potential artefacts. These and other improvements are further described in connection with and are apparent from the figures herein below.

Figure 1:
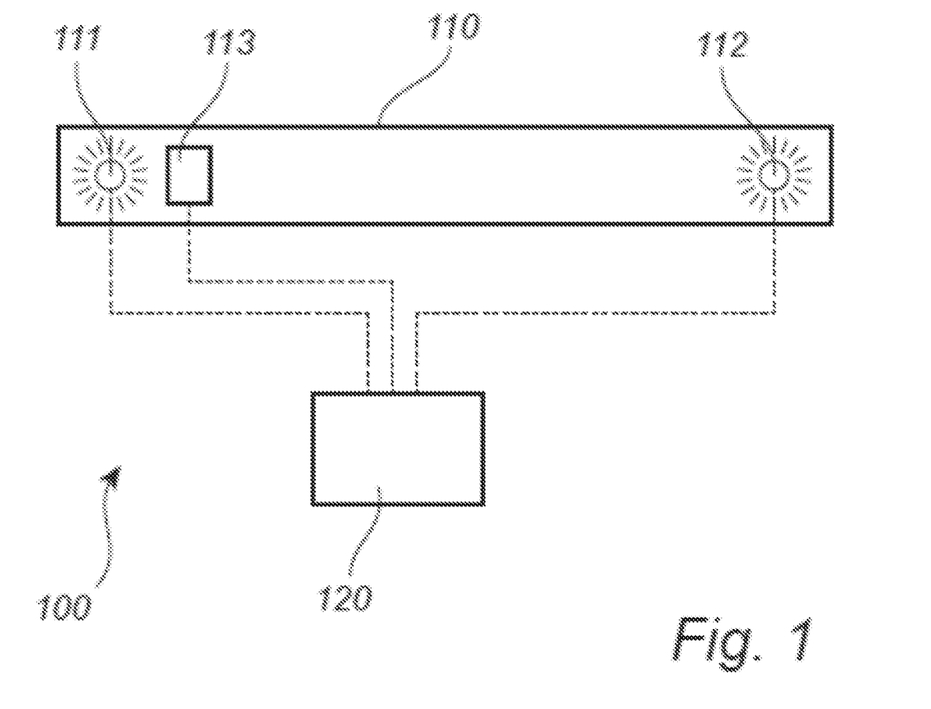
FIG. 1 illustrates an eye tracking system, according to an embodiment of the present disclosure.

FIG. 1 shows an eye tracking system 100 (which may also be referred to as a gaze tracking system), according to an embodiment. The system 100 comprises illuminators 111 and 112 for illuminating the eyes of a user, and an image sensor 113 for capturing images of the eyes of the user. The illuminators 111 and 112 may for example, be light emitting diodes emitting light in the infrared frequency band, or in the near infrared frequency band. The image sensor 113 may for example be a camera, such as a complementary metal oxide semiconductor (CMOS) camera or a charged coupled device (CCD) camera. The camera is not limited to be an IR camera, a depth camera, or a light-field camera. The shutter mechanism of the image sensor 113 can be either a rolling shutter or a global shutter.

A first illuminator 111 is arranged coaxially with (or close to) the image sensor 113 so that the image sensor 113 may capture bright pupil images of the user's eyes. Due to the coaxial arrangement of the first illuminator 111 and the image sensor 113, light reflected from the retina of an eye returns back out through the pupil towards the image sensor 113, so that the pupil appears brighter than the iris surrounding it in images where the first illuminator 111 illuminates the eye. A second illuminator 112 is arranged non-coaxially with (or further away from) the image sensor 113 for capturing dark pupil images. Due to the non-coaxial arrangement of the second illuminator 112 and the image sensor 113, light reflected from the retina of an eye does not reach the image sensor 113 and the pupil appears darker than the iris surrounding it in images where the second illuminator 112 illuminates the eye. The illuminators 111 and 112 may for example, take turns to illuminate the eye, so that every first image is a bright pupil (BP) image, and every second image is a dark pupil (DP) image.

The eye tracking system 100 also comprises circuitry 120 (for example including one or more processors) for processing the images captured by the image sensor 113. The circuitry 120 may for example, be connected to the image sensor 113 and the illuminators 111 and 112 via a wired or a wireless connection. In another example, circuitry 120 in the form of one or more processors may be provided in one or more stacked layers below the light sensitive surface of the image sensor 113.

Figure 2:
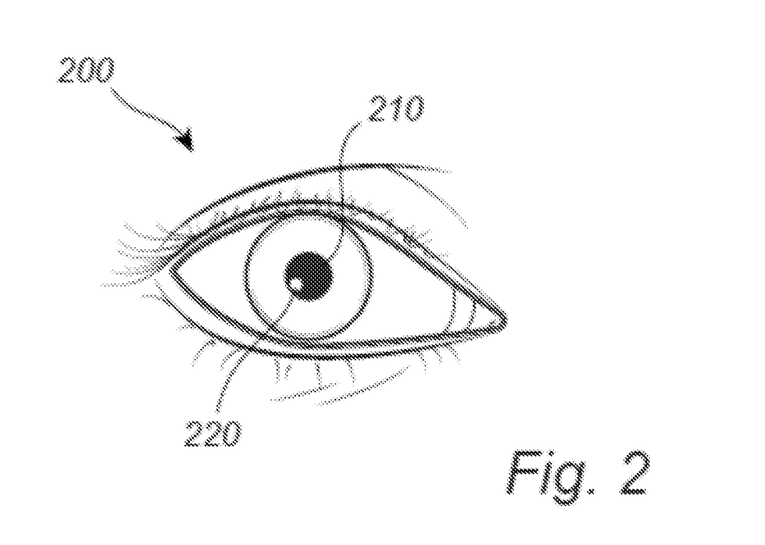
FIG. 2 illustrates an example of an image of an eye capture by an image sensor, according to an embodiment of the present disclosure.

FIG. 2 shows an example of an image of an eye 200, captured by the image sensor 113. The circuitry 120 may for example, employ image processing (such as digital image processing) for extracting features in the image. The circuitry 120 may for example employ pupil center cornea reflection (PCCR) eye tracking to determine where the eye 200 is looking. In PCCR eye tracking, the processor 120 estimates the position of the center of the pupil 210 and the position of the center of a glint 220 at the eye 200. The glint 220 is caused by reflection of light from one of the illuminators 111 and 112. The processor 120 calculates where the user is in space using the glint 220 and where the user's eye 200 is pointing using the pupil 210. Since there is typically an offset between the optical center of the eye 200 and the fovea, the processor 120 performs calibration of the fovea offset to be able to determine where the user is looking. The gaze directions obtained from the left eye and from the right eye may then be combined to form a combined estimated gaze direction (or viewing direction). As will be described below, many different factors may affect how the gaze directions for the left and right eyes should be weighted relative to each other when forming this combination.

In the embodiment described with reference to FIG. 1, the illuminators 111 and 112 are arranged in an eye tracking module 110 placed below a display watched by the user. This arrangement serves only as an example. It will be appreciated that more or less any number of illuminators 111 and 112 and image sensors 113 may be employed for eye tracking, and that such illuminators 111 and 112 and image sensors 113 may be distributed in many different ways relative to displays watched by the user. It will be appreciated that the eye tracking scheme described in the present disclosure may, for example, be employed for remote eye tracking (for example in a personal computer, a smart phone, or integrated in a vehicle) or for wearable eye tracking (such as in virtual reality glasses or augmented reality glasses).

Figure 3:
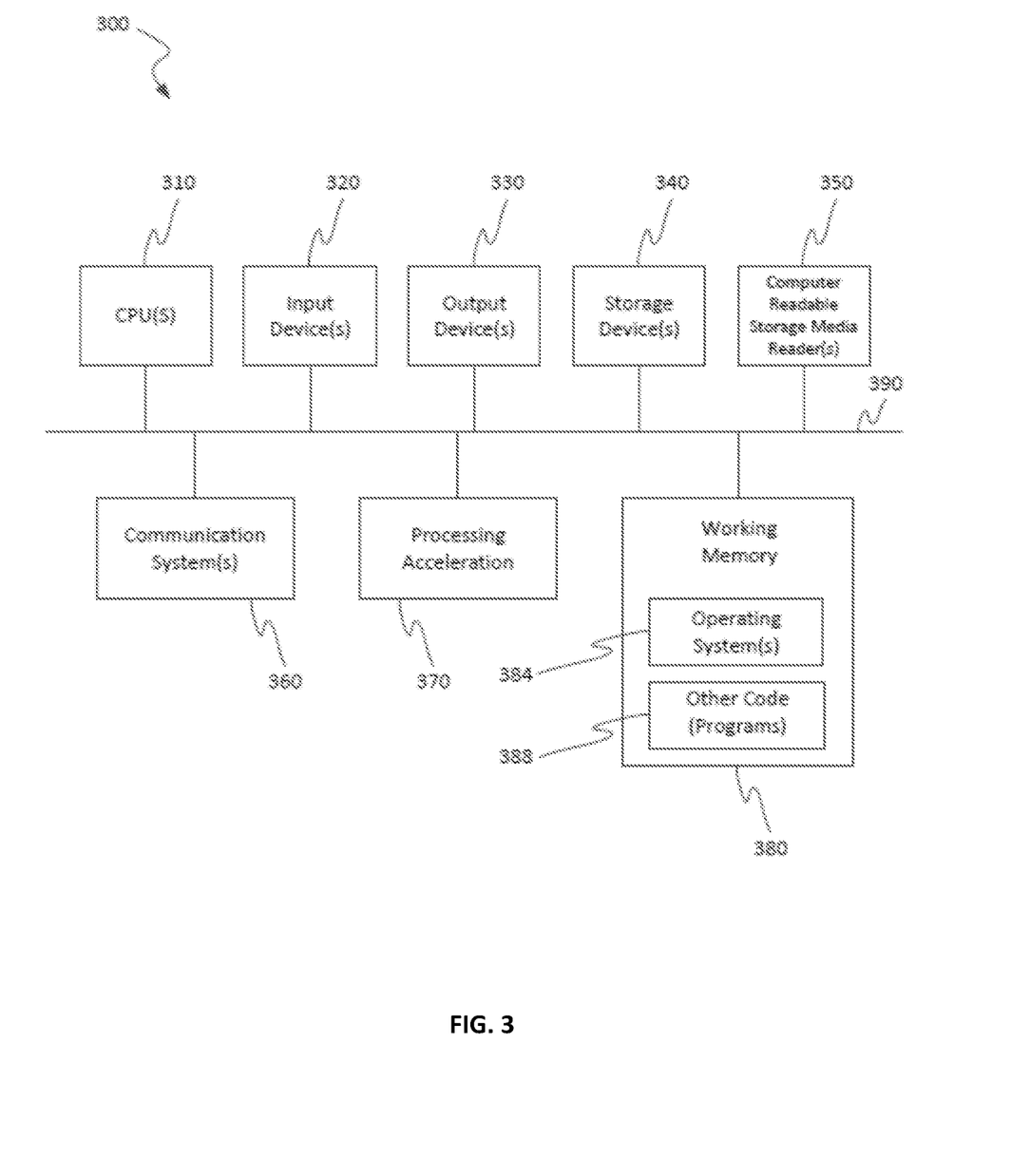
FIG. 3 illustrates a block diagram of a specialized computer system, according an embodiment of the present disclosure.

FIG. 3 is a block diagram illustrating a specialized computer system 300 in which embodiments of the present disclosure may be implemented. This example illustrates a specialized computer system 300 such as may be used, in whole, in part, or with various modifications, to provide the functions of components described herein.

Specialized computer system 300 is shown comprising hardware elements that may be electrically coupled via a bus 390. The hardware elements may include one or more central processing units 310, one or more input devices 320 (e.g., a mouse, a keyboard, eye tracking device, etc.), and one or more output devices 330 (e.g., a display device, a printer, etc.). Specialized computer system 300 may also include one or more storage devices 340. By way of example, storage device(s) 340 may be disk drives, optical storage devices, solid-state storage devices such as a random access memory ("RAM") and/or a read-only memory ("ROM"), which can be programmable, flash-updateable and/or the like.

Specialized computer system 300 may additionally include a computer-readable storage media reader 350, a communications system 360 (e.g., a modem, a network card (wireless or wired), an infra-red communication device, Bluetooth™ device, cellular communication device, etc.), and working memory 380, which may include RAM and ROM devices as described above. In some embodiments, specialized computer system 300 may also include a processing acceleration unit 370, which can include a digital signal processor, a special-purpose processor and/or the like.

Figure 4:
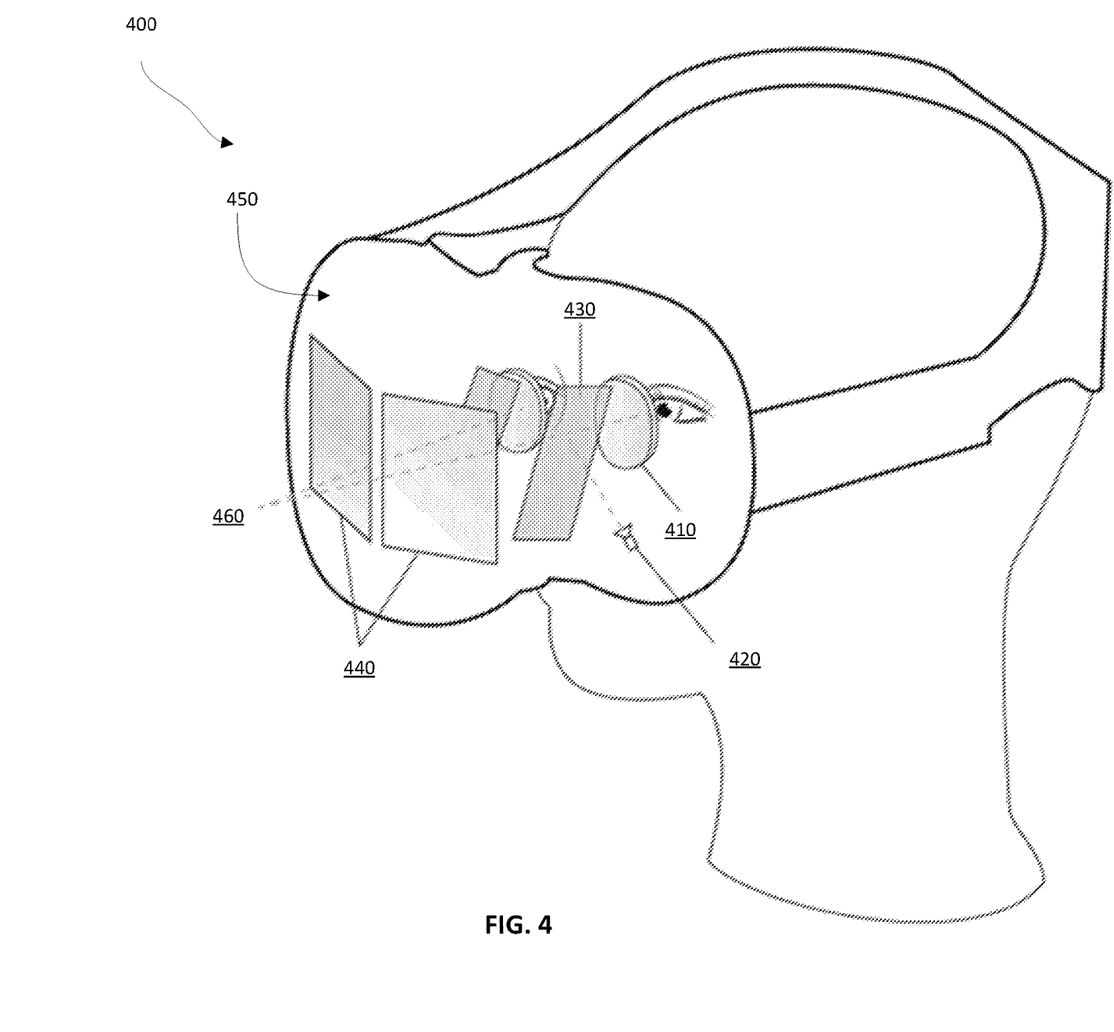
FIG. 4 illustrates an example of a wearable computing device that implements components of an eye tracking system, according to an embodiment of the present disclosure.

FIG. 4 shows an example of a wearable computing device 400 that implements some or all of the above components of an eye tracking system 100 as described in connection with FIGS. 1-2. The wearable computing device 400 can be a VR headset or an AR headset that can be worn by a user. As illustrated, the wearable computing device 400 includes a set of lenses 410, such as Fresnel lenses, a set of cameras 420, a set of hot mirrors 430, and a set of displays 440. The camera 420 can include the image sensors 113 of FIG. 1. Although not shown in FIG. 4, the wearable computing device 400 can also include a set of illuminators and processing circuitry. These and other components can be integrated within a housing 450 of the wearable computing device 400. In this way, upon the user mounting the wearable computing device 400 on his or her head, the set of lenses 410 would be relatively close to the user's eyes and the set of displays would be relatively far from the user's eye, and the remaining components may be located in between. The arrangement of these components allows the detection of the user's gaze point in three-dimensional virtual or real space.

Figure 5:
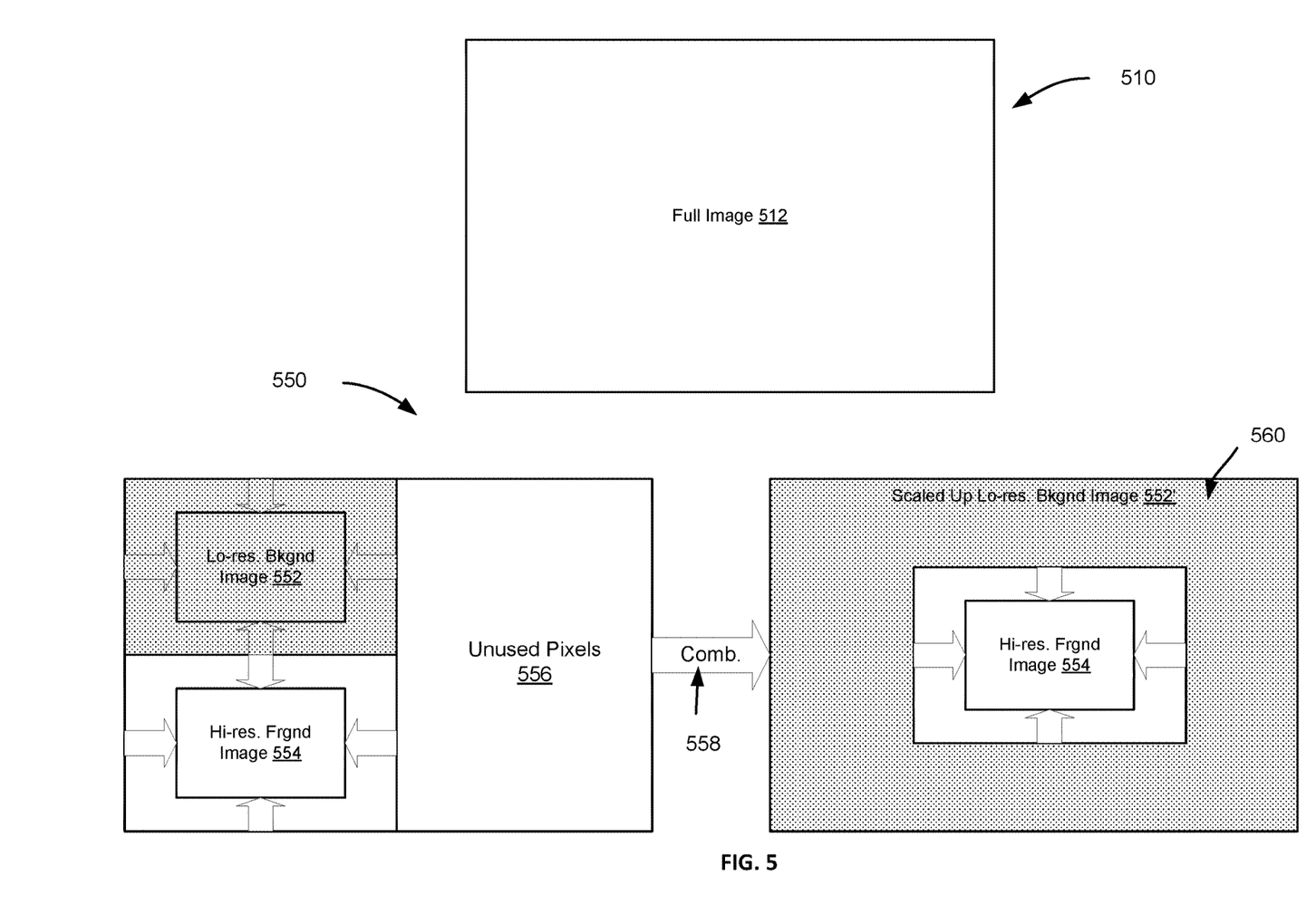
FIG. 5 illustrates an example of a comparison between unfoveated and foveated rendering, according to an embodiment of the present disclosure.

FIG. 5 illustrates an example of a comparison between unfoveated rendering 510 and foveated rendering 550, according to an embodiment of the present disclosure. In an example, the unfoveated rendering involves presenting a full image 512 on an image display region of a display. The full image 512 has an image resolution (e.g., a predefined pixel density), is rectangular (or some other geometric shape), and has a width $W_T$ and length $L_T$. This type of rendering necessitates relatively expensive pixel shaders for the entire display. In the context of a virtual reality headset, the full image 512 corresponds to a field of view of the user.

In comparison, the foveated rendering 550 uses relatively less pixel shaders. For instance, and as illustrated in FIG. 5, the foveated rendering 550 involves fifty percent less pixels than the unfoveated rendering 510, although other possible pixel shader savings are possible depending on the configuration of the foveated rendering 550.

In an example configuration, the foveated rending 550 involves a low resolution background image 552 and a high resolution foreground image 554. For instance, the background image 552 has a lower resolution than the image resolution (e.g., having half the pixel density) and smaller dimensions than the image display region (e.g., being rectangular and having half the width $W_T$ and half the length $L_T$). The foreground image 554 has a same or similar resolution as the image resolution but smaller dimensions than the image display region (e.g., being rectangular and having half the width $W_T$ and half the length $L_T$). In an example, the background image 552 corresponds to the entire content of the full image 512 (e.g., the entire scene or the field of view of the user within the context of the virtual reality headset) or to an over-scan of the image display region. In comparison, the foreground image 554 corresponds to a foveated region (e.g., a region centered or contained the user gaze location while being smaller than the image display region). Accordingly, a number of pixels 556 remain unused, thereby reducing the processing for presenting content relative to the unfoveated rendering 510.

The foveated rendering 550 also includes combining 558 the low resolution background image 552 and the high resolution foreground image 554 to generate a composite image 560. The combining includes scaling up the background image 552 (shown as a scaled up low resolution background image 552' in FIG. 5) and overlaying the high resolution foreground image 554 on top of the scaled up background image 552' depending on the gaze location. The composite image 560 is presented in the image display region of the display. Accordingly, rather than presenting the full image 512, the composite image 560 is presented, where only the foreground image 552 is presented at a high resolution (e.g., the image resolution) and the remaining portion of the composite image is presented at a low resolution.

Foveated rendering can be performed for a pair of eyes gazing at a same display (where the gaze is tracked with one or more cameras) or per eye gazing at a separate display (e.g., for stereoscopic display, such as in a virtual reality headset, where a left image and a right image are displayed for the left eye and right eye, respectively). In the latter case, the foveated rendering involves a low resolution background image, a high resolution foreground, and a corresponding composite image per eye (e.g., a total of two background images, two foreground images, and two composite images). In the interest of clarity of explanation, the embodiments are described herein in connection to a single set of images (e.g., a low resolution background image, a high resolution foreground eye, and a corresponding composite image). In the case of stereoscopic display, the embodiments similarly apply by using a second set of images for the second eye.

Figure 6:
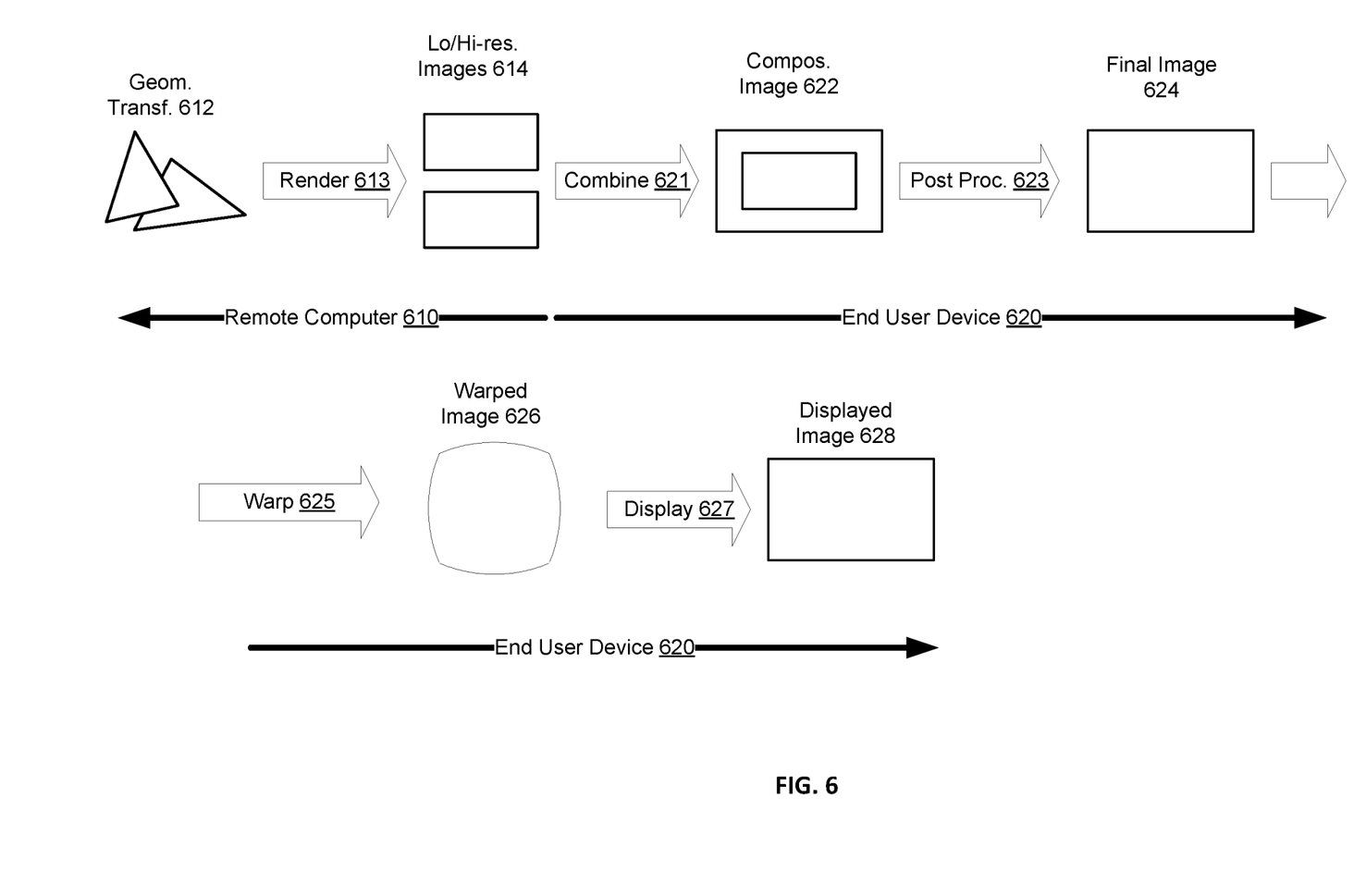
FIG. 6 illustrates an example of distributed foveated rendering between a remote computer and an end user device, according to an embodiment of the present disclosure.

FIG. 6 illustrates an example of distributed foveated rendering between a remote computer 610 and an end user device 620, according to an embodiment of the present disclosure. As illustrated, the remote computer 610 renders 613 (e.g. performs rasterization, coloring, and lighting of) low resolution background and high resolution foreground images 614 based on geometry transforms 612 (e.g., using polygons, geometric primitives, vertices, and the like).

The end user device 620 combines 621 the low resolution background and high resolution foreground images 614 to generate a composite image 622. Post processing 623 is also possible on the composite image 622 to generate a final image 624. For instance, the end user device blends overlapping boundaries of the scaled up low resolution background image and the overlaid high resolution foreground image and reduces artefacts. If the end user device 620 is a virtual reality headset, a lens is located between the user eye and the display (when the headset is worn by the user). Hence, lens warping occurs and should be compensated such that the user would perceive a correct image. In this case, the end user device 620 (e.g., the virtual reality headset) warps 625 the final image 624 to generate a warped image 626 based on a lens warp compensation. Finally, the end user device 620 displays 627 the warped image 626 on the display, thereby presenting a displayed image 628 to the user based on the distributed foveated rendering.

Figure 7:
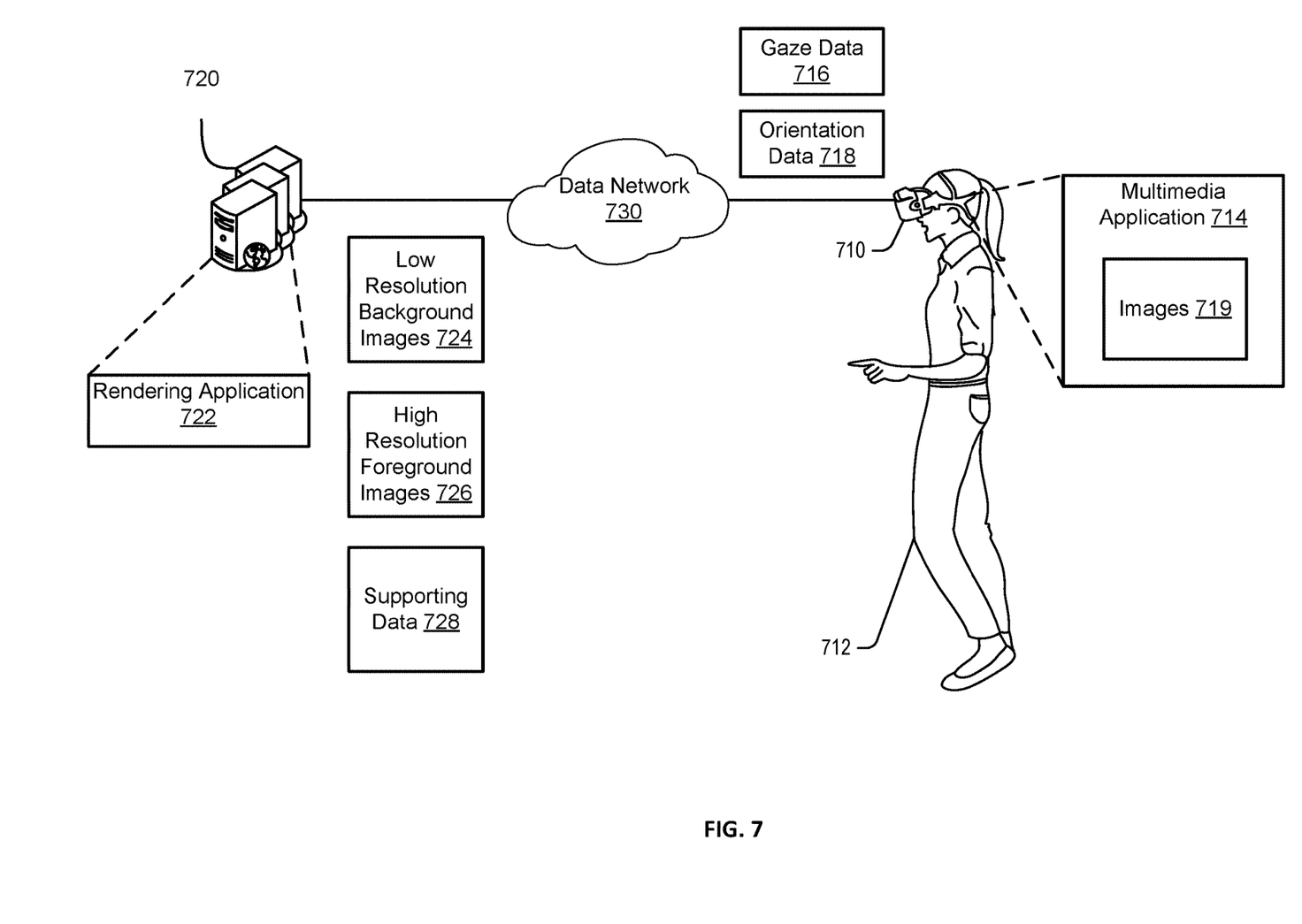
FIG. 7 illustrates an example of a computing environment within which distributed foveated rendering is performed, according to an embodiment of the present disclosure.

FIG. 7 illustrates an example of a computing environment within which distributed foveated rendering is performed, according to an embodiment of the present disclosure. The environment includes an end user device 710, a remote computer 720, and a data network 730. The data network 730 communicatively couples the end user device 710 and the remote computer 720. The foveated rendering is distributed between the end user device 710 and the remote computer based on data communications between these two components over the data network 730.

In an example, the data communications involve transmissions, from the end user device 710, of gaze data 716 corresponding to a gaze of a user 712 on a display associated with the end user device 710. The gaze data 716 includes, for instance, a gaze direction of the user 712 and/or gaze location on the display (e.g., (X, Y) coordinates of the gaze point on the display). The data communications also involve transmissions from the end user device 710 of orientation data 718 corresponding to an orientation in the physical space of the end user device 710 and/or the display. The orientation data 718 includes, for instance, rotational and/or translational movement data amount to three or six degrees of freedom data (e.g., (X, Y, Z) coordinates and roll, pitch, and yaw).

The data communications from the computer system 720 involve, for example, transmissions of low resolution background images 724, high resolution foreground images 726, and supporting data 728. Such images are rendered by the remote computer 720 based on the gaze data 716 and/or orientation data 718. The supporting data 728 includes description of the foveal region among other data needed for the end user device 710 to generate and present final images based on the low resolution background images 724 and high resolution foreground images 726.

In an example, the data network 730 is any suitable network for facilitating the data communications between the end user device 710 and the remote computer 720. For instance, the data network 730 includes the Internet and/or a private network, is wireless and/or wired, and/or uses point-to-point, broadcast, unicasts communications, and/or other protocols. Generally, the distributed foveated rendering improves the bandwidth usage of the data network 730 which can become more relevant in the context of wireless communications.

The end user device 710 is any suitable computing device for presenting content on a display based on the user gaze data 716 (such as any of the devices illustrated in connection with FIGS. 1 and 3-4). For example, the end user device 710 includes an eye tracking system that performs the gaze detection and outputs the gaze data 716 as illustrated in connection with FIGS. 1 and 3-4. This system may be integrated with or may interface with other components of the end user device 710. In illustrative examples, the end user device 710 is any of a virtual reality headset, an augmented reality headset, or any other wearable computing device that integrates the eye tracking system. In other illustrative examples, the end user device 710 is any of a desktop computer, a laptop, a tablet, a smartphone, or any other computing device that integrates or interfaces with the eye tracking system. Generally, the end user device 710 hosts a multimedia application 714 that presents an images 719 on the display (e.g., video content according to a particular frame rate).

In an example, the distributed foveated rendering is supported by the multimedia application 714 running on a general purpose computer (e.g., a microprocessor) of the end user device 710. For example, this application generates the images 719 from the low resolution background images 724 and high resolution foreground images 726 based on the supporting data 728, the gaze data 716, and updated orientation data (as further described in connection with the next figure). In another example, the end user device 710 includes a graphics processing unit or specialized hardware (e.g., an application-specific integrated circuit (ASIC)) that generates the images 719.

The remote computer 720 is any suitable computing device for rendering the low resolution background images 724 and the high resolution foreground images 726 based on the gaze data 716 and the orientation data 718. For example, the remote computer 720 is a video game console, a host computer, a laptop computer, a desktop computer, a server, a cloud computing resource, and the like. Generally, the remote computer 710 hosts a rendering application 722 that renders the low resolution background images 724 and the high resolution foreground images 726.

Figure 8:
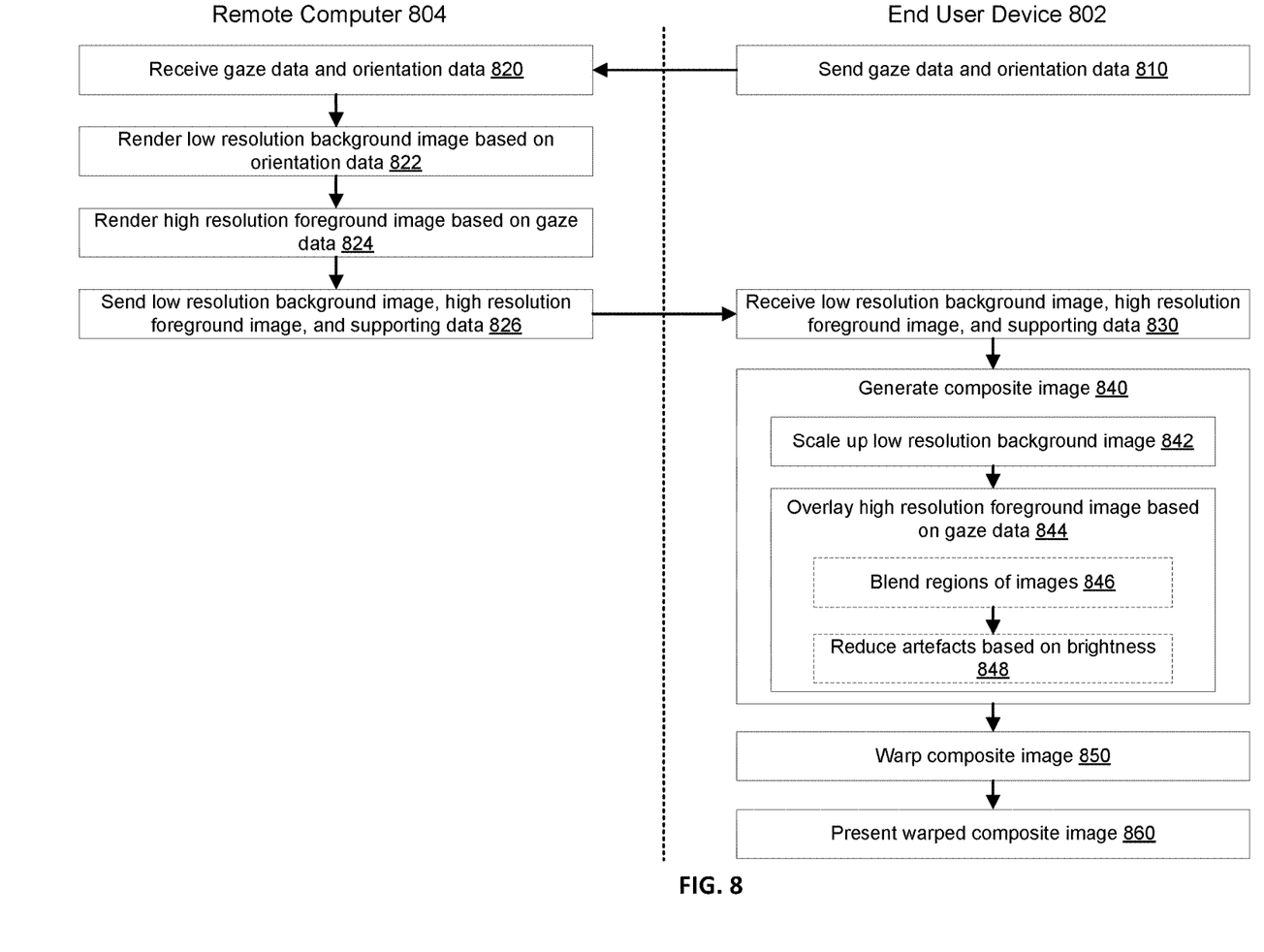
FIG. 8 illustrates an example of a flow for distributing foveated rendering between an end user device and a remote computer, according to an embodiment of the present disclosure.

FIG. 8 illustrates an example of a flow for distributing foveated rendering between an end user device 802 and a remote computer 804, such as the end user device 710 and the remote computer 720 of FIG. 7, according to an embodiment of the present disclosure. The combination of the end user device 802 and the remote computer 804 represents a distributed computer system. Instructions for performing operations of the flow can be stored as computer-readable instructions on a non-transitory computer-readable medium of the end user device 802 and the remote computer 804 (e.g., of the distributed computer system). As stored, the instructions represent programmable modules that include code or data executable by processors of the end user device 802 and the remote computer 804. The execution of such instructions configures the distributed computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered.

The example flow starts at operation 810, where the end user device 802 sends gaze data and orientation data to the remote computer 804. In an example, this data is transmitted over a data network. The transmission rate can be the same as or a fraction (e.g., half) of a frame rate (ninety frames per second) for displaying content on a display associated with the end user device 802.

At operation 820, the remote computer 804 receives the gaze data and the orientation data from the end user device 802. In an example, this data is received over the data network at the particular transmission rate.

At operation 822, the remote computer 804 renders a low resolution background image based on the orientation data. In an example, the remote computer 804 uses the orientation data to determine a field of view of a user of the end user device (e.g., within the context of stereoscopic content presentation such as by a virtual reality headset). The remote computer 804 accesses from memory information about the image resolution (e.g., a predefined pixel density) and dimensions of an image display region of the display (e.g., this information can be pre-stored in the memory based on user input or can be stored in the memory based on communications between the remote computer 804 and the end user device 802) to derive information about the targeted resolution (e.g., a targeted pixel density that is half of the predefined pixel density) and dimensions of the low resolution background image (e.g., half of the image display region's dimensions). Alternatively, the targeted resolution and dimensions can be stored in the memory and directly accessed therefrom. Accordingly, the remote computer 804 renders the low resolution foreground image based on content that belongs to the field of view and on the targeted resolution and dimension. In an example of a wearable computing device, the low resolution foreground image represents either the entire scene to be displayed or includes over-scan data to allow temporal warping to account for latent head movement.

At operation 824, the remote computer 804 renders a high resolution foreground image based on the gaze data. In an example, the remote computer 804 determines a location of the user gaze on the display (e.g., (X, Y) display coordinates) and defines a foveated region centered around or containing that location. The computer system 804 also determines a targeted resolution for the foreground image and a targeted dimension for the foveated region (or, equivalently, the foreground image) directly from memory or by derivation from the full resolution and the image display region's dimension. Accordingly, the remote computer 804 renders the high resolution foreground image based on content that belongs to the foveated region and on the targeted resolution and dimension.

At operation 826, the remote computer 804 sends the low resolution background image, the high resolution foreground image, and supporting data to combine these images to the end user device 802. In an example, these images are transmitted over the data network in response to receiving the gaze data and the orientation data. The supporting data includes compositing position and size information about the images to enable the proper compositing of these two images (including their sizing and positioning) by the end user device 802. The compositing position corresponds to, for instance, the gaze data (e.g., the (X, Y) display coordinates) that was used by the remote computer 804 to render the low resolution background image and the high resolution foreground image. in this way, when the end user device 802 overlays the high resolution foreground image, it overlays it at the proper location corresponding to the same location used by the remote computer 804, thereby avoiding potential artefacts. In addition, the two images can be compressed prior to the transmission to reduce the usage of network bandwidth. To further reduce bandwidth usage, the data to be transmitted can undergo further reduction. In an example, this further reduction includes eliminating or reducing the redundant data in the background image (where corresponding data also exists in the foreground image, thereby obscuring the redundant data in the background image otherwise), clipping less visually important areas of the foveal region (for instance clipping to an oval, octagonal or hexagonal shape), and reducing the color accuracy of the background image.

At operation 830, the end user device 802 receives the low resolution background image and the high resolution foreground image. In an example, these images are received over the data network. If the gaze data is also transmitted, the end user device 802 will also receive it.

At operation 840, the end user device 802 generates a composite image from the low resolution background image and the high resolution foreground image. In an example, this operation includes multiple sub-operations. Some of the sub-operations are optional, as indicated herein below. While the example flow of FIG. 8 illustrates these sub-operations as discrete and separate processes, it should be understood that no particular order is necessary, that one or more sub-operations may be omitted, skipped, and/or reordered, and that some or all of the sub-operations may be combined.

At sub-operation 842, the end user device 802 scales up the low resolution background image. In an example, the end user device 802 resizes this background image to fit the image display region by duplicating pixels horizontally and vertically. The scaling up could take several forms with varying levels of quality and processing costs. For instance, simple pixel duplication, bi-linear stretching of the image, and/or temporal up-scaling using data from previous frames stored locally on the end user device 802 can be used. If the received low resolution background image was compressed for the transmission, the end user device 802 decompresses it prior to the scaling up.

At sub-operation 844, the end user device 802 overlays the high resolution foreground image based on the gaze data. In an example, the end user device 802 uses the (X, Y) display coordinates to position the high resolution foreground image on top of the scaled up low resolution background image. If the received high resolution foreground image was compressed for the transmission, the end user device 802 decompresses it prior to the overlaying. Various sub-operations, as illustrated with the dashed lines around sub-operation 846 and 848, are optional under sub-operation 844 and can be used to improve the quality of the compositing.

At sub-operation 846, the end user device 802 blends regions of the scaled up low resolution background image and the overlaid high resolution foreground image. In an example, an internal region of the scaled up background image overlaps with a boundary region of the overlaid foreground image. Accordingly, the end user device 802 blends the internal region and the boundary region to reduce artefacts such as sharp transitions between high and low resolution image regions. The blending involves linear interpolation of pixels in a linear light space. Each region can have a predefined dimension (e.g., in width and/or length) as a function (e.g., percentage) of the dimension of the image display region (e.g., if the image display region is 1024 pixels wide, the internal region and the boundary region can be fifty pixels wide each, or about five percent of the image display region's width).

At operation 848, the end user device 802 reduces artefacts based on brightness. In an example, when the composite image is presented in the image display region, the displayed image shows an object that spans the low resolution and high resolution regions of this image. Accordingly, within and nearby the boundary region, two proximate portions of the object (a first portion presented at the high resolution and a second, proximate portion presented at the low resolution) are visible at different brightness levels, thereby resulting in an undesired artefact. To avoid this type of artefacts, the end user device 802 adjusts (e.g., reduces) the brightness of the first portion to be close to, gradually close to, or the same as the brightness of the second portion.

For instance, the object is an edge visible in the composite image. The end user device 802 runs an edge detection algorithm on the overlaid high resolution foreground image and detects the edge and determines that a first portion of the edge is within the boundary region of this image. Thereafter, the end user device 802 selects a first pixel from pixels of the overlaid high resolution image, where this pixel is one of the edge's pixels. The end user device 802 determines a second pixel from the scaled up low resolution image, where the first pixel and the second pixel have a same pixel location in the composite image. The end user device 802 compares the brightness of the first pixel to the brightness of the second pixel to determine a brightness difference. Based on a comparison of the brightness difference to a predefined threshold (e.g., if the brightness difference is larger than the predefined threshold), the end user device 802 determines that the brightness of the first pixel should be adjusted. Accordingly, the end user device 802 reduces the brightness of the first pixel based on the brightness difference (e.g., as an inverse of this difference). This process can be repeated for the various pixels from the first portion of the edge and to other portions that are proximate to this first portion and visible at the high resolution.

At operation 850, the end user device 802 warps the composite image. In an example, two warping sub-operations are possible: one for lens compensation and one for temporal warping. In particular, the end user device 802 can include a virtual reality headset. If so, the composite image is warped based on a warp compensation for a lens of the virtual reality headset. In addition, the end user device 802 can optionally perform temporal anti-aliasing using data from previous frames, including data about pixel locations of objects over time. Further, the end user device 802 can optionally perform optional gamma correction. As described herein above, different processes are performed in linear light space. Accordingly, it is preferable that data up to this point remain in linear light space to avoid multiple conversions to and from the linear space. Prior to output the data can be gamma corrected for presentation on the display.

The temporal warping is performed based on updated orientation data of the end user device 802 or the display (e.g., based on updated orientation data of the virtual reality headset) and includes repositioning a presentation boundary of the scaled up background image (e.g., changing the four corners that define this presentation boundary). In particular, between the time the user device 802 sent the orientation data (e.g., under operation 810) and the time the user device 802 is about to present the composite image (e.g., after the composite image has been generated under operation 840), the orientation data may have changed, thereby changing the field of view of the user. To avoid unwanted artefacts related to an outdated field of view, the end user device 802 accesses the most up-to-date orientation data and warps the composite image according to this data. In an example, the composite image as generated under operation 840 is larger than the image display region corresponding to the entire scene or to an over-scan (e.g., the scaled up low resolution background image has a dimension that is some percentage larger than the full display image). Based on the updated orientation data, the end user device 802 moves the four corners of the presentation boundary to new locations within the composite image to define a new presentation boundary. When the composite image is presented, only the regions falling within the new presentation boundary are visible in the image display area and, thus, correspond to the most up-to-date field of view. Further, temporal warping can be used to optionally generate additional frames. For instance, between transmissions from the remote computer 804, the end user device 802 may generate intermediate frames by using the latest orientation data and applying temporal warping to the composite image.

The temporal warping according to the distributed foveated rendering of embodiments of the present disclosure provides improvements related to usage of processing resources, network bandwidth, and processing latencies. For example, a desired frame rate for content presentation is ninety frames per second. A configuration to meet this frame rate can present the same frame every one forty-fifth of a second (e.g., at half the frame rate). Because the same frame is presented twice, the temporal warping can be performed twice depending on the orientation data to change the presentation boundary and follow the user's field of view. In comparison, if the processing were pushed to the remote computer 804, that computer would need to generate and transmit two composite images for the user device 802 to then temporally warp.

At operation 860, the end user device 802 presents the warped composite image. In an example, the composite image (as warped and artefact-reduced under operations 848-850) is presented in the image display region of the display.

Hence, as illustrated in FIG. 8, the processing is shared between the remote computer 804 and the end user device 802. Commonly used processing, including the compositing of the final image, can be performed on the end user device 802, thereby enabling the use of lower power remote computers (e.g., hosts) to drive displays of end user devices with an improved quality.

Figure 9:
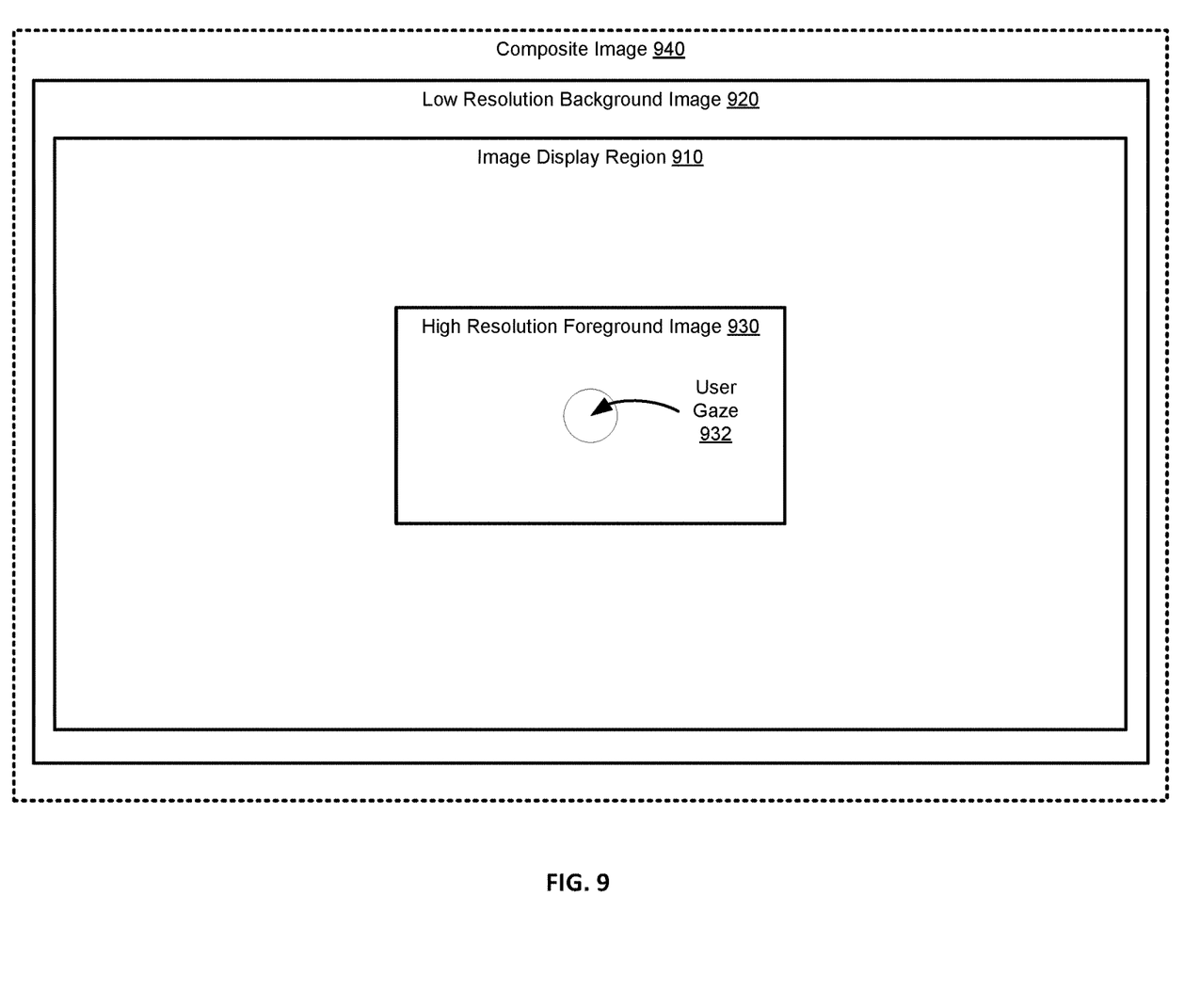
FIG. 9 illustrates an example of images used to support distributed foveated rendering, according to an embodiment of the present disclosure.

FIG. 9 illustrates an example of images used to support distributed foveated rendering, according to an embodiment of the present disclosure. As illustrated, an image display region 910 corresponds to a region available on a display for presenting content, such as images. The outer boundary of this region 910 and its four corners correspond to the presentation boundary and the four corners described in connection with the temporal warping. A low resolution background image 920 has a low pixel density. In the case of an over-scan, the low resolution background image 920 has a larger dimension (e.g., in width and/or length) than the image display region 910. A high resolution foreground image 930 has a higher pixel density than the background image 920 and a smaller dimension than the image display region 910. When overlaid in a composite image 940, the high resolution foreground image 930 is centered around or contains the location of a user gaze 932 on the display. The composite image 940 includes a combination of a scaled up low resolution background image (not shown, but is equivalent to scaling up the background image 920 such that it fits the dashed boundary of the composite image 940) and an overlaid high resolution foreground image (e.g., the foreground image 930 positioned over the scaled up low resolution background image, where the positioning depends on the location of the user gaze 932).

The disclosure has now been described in detail for the purposes of clarity and understanding. However, it will be appreciated that certain changes and modifications may be practiced within the scope of the appended claims.

The above description provides exemplary embodiments only, and is not intended to limit the scope, applicability or configuration of the disclosure. Rather, the above description of the exemplary embodiments will provide those skilled in the art with an enabling description for implementing one or more exemplary embodiments. It being understood that various changes may be made in the function and arrangement of elements without departing from the spirit and scope of the disclosure as set forth herein.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the disclosure may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to, transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the disclosure may be implemented, at least in part, either manually or automatically. Manual or automatic implementations may be executed, or at least assisted, using machines, hardware, software, firmware, middleware, microcode, hardware description languages, or any combination thereof. When implemented in software, firmware, middleware or microcode, the program code or code segments to perform the necessary tasks may be stored in a machine-readable medium. A processor or processors may perform the necessary tasks.

As used herein, the phrase "a first thing based on a second thing," and the like, may mean that the first thing is based solely on the second thing, or that the first thing is based on the second thing as well as one or more additional things.

What is claimed is:

1. A method for distributed foveated rendering between a remote computer and an end user device that presents images on a display based on user gaze, the method implemented on the end user device and comprising:
   receiving, from the remote computer, a background image and a foreground image, wherein:
   the background image has a lower resolution than the foreground image and has first dimensions that are smaller than an image display region of the display, and
   the foreground image has second dimensions that are equal to a foveated region located within the image display region;
   generating a composite image by scaling up the background image to the image display region and by overlaying the foreground image based on gaze data of a user of the end user device;
warping the composite image; and
presenting the warped composite image in the image display region of the display; and
wherein the method further comprises
determining a brightness difference between a first pixel from the overlaid foreground image and a second pixel from the scaled up background image, wherein the first pixel and the second pixel correspond to a same object visible in the composite image; and
adjusting a brightness of the first pixel based on a comparison of the brightness difference to a predefined threshold.

2. The method of claim 1, wherein generating the composite image further comprises:
blending an internal region of the scaled up background image and a boundary region of the overlaid foreground image, wherein the internal region and the boundary region are overlapping.

3. The method of claim 1, wherein the object is an edge, and further comprising:
selecting the first pixel from pixels of the overlaid foreground image for comparison to the second pixel based on a determination that the first pixel belongs to the edge, and wherein adjusting the brightness comprises reducing the brightness of the first pixel.

4. The method of claim 1, wherein the end user device comprises a virtual reality headset, and wherein the composite image is warped based on a warp compensation for a lens of the virtual reality headset.

5. The method of claim 4, wherein warping the composite image comprises repositioning a presentation boundary of the scaled up background image based on orientation data of the virtual reality headset.

6. The method of claim 1, further comprising:
sending, to the remote computer, the gaze data of the user and orientation data of the end user device, wherein:
the background image is rendered by the remote computer based on the orientation data,
the foreground image is rendered by the remote computer based on the gaze data, and
warping the composite image comprises repositioning a presentation boundary of the scaled up background image based on updated orientation data of the end user device.

7. A non-transitory computer-readable storage medium storing instructions that, upon execution on an end user device, configure the end user device to perform operations comprising:
receiving, from a remote computer, a background image and a foreground image, wherein:
the background image has a lower resolution than the foreground image and has first dimensions that are smaller than an image display region of a display, and
the foreground image has second dimensions that are equal to a foveated region located within the image display region;
generating a composite image by scaling up the background image to the image display region and by overlaying the foreground image based on gaze data of a user of the end user device;
warping the composite image; and
presenting the warped composite image in the image display region of the display;
wherein the operations further comprise:
determining a brightness difference between a first pixel from the overlaid foreground image and a second pixel from the scaled up background image, wherein the first pixel and the second pixel correspond to a same object visible in the composite image; and
adjusting a brightness of the first pixel based on a comparison of the brightness difference to a predefined threshold.

8. The non-transitory computer-readable storage medium of claim 7, wherein generating the composite image further comprises:
blending an internal region of the scaled up background image and a boundary region of the overlaid foreground image, wherein the internal region and the boundary region are overlapping.

9. The non-transitory computer-readable storage medium of claim 7, wherein the object is an edge, and wherein the operations further comprise:
selecting the first pixel from pixels of the overlaid foreground image for comparison to the second pixel based on a determination that the first pixel belongs to the edge, and wherein adjusting the brightness comprises reducing the brightness of the first pixel.

10. The non-transitory computer-readable storage medium of claim 7, wherein the end user device comprises a virtual reality headset, and wherein the composite image is warped based on a warp compensation for a lens of the virtual reality headset.

11. The non-transitory computer-readable storage medium of claim 10, wherein warping the composite image comprises repositioning a presentation boundary of the scaled up background image based on orientation data of the virtual reality headset.

12. The non-transitory computer-readable storage medium of claim 7, wherein the operations further comprise:
sending, to the remote computer, the gaze data of the user and orientation data of the end user device, wherein:
the background image is rendered by the remote computer based on the orientation data,
the foreground image is rendered by the remote computer based on the gaze data, and
warping the composite image comprises repositioning a presentation boundary of the scaled up background image based on updated orientation data of the end user device.

13. A computer system comprising:
a remote computer; and
an end user device configured to present image on a display based on user gaze, wherein the end user device comprises memory storing instructions that, upon execution on the end user device, configure the end user device to perform operations comprising:
receiving, from the remote computer, a background image and a foreground image, wherein:
the background image has a lower resolution than the foreground image and has first dimensions that are smaller than an image display region of the display, and
the foreground image has second dimensions that are equal to a foveated region located within the image display region;
generating a composite image by scaling up the background image to the image display region and by overlaying the foreground image based on gaze data of a user of the end user device;
warping the composite image; and
presenting the warped composite image in the image display region of the display;

wherein the operations further comprise:
determining a brightness difference between a first pixel from the overlaid foreground image and a second pixel from the scaled up background image, wherein the first pixel and the second pixel correspond to a same object visible in the composite image; and
adjusting a brightness of the first pixel based on a comparison of the brightness difference to a predefined threshold.

14. The computer system of claim 13, wherein the end user device comprises a virtual reality headset, and wherein the composite image is warped based on a warp compensation for a lens of the virtual reality headset.

15. The computer system of claim 14, wherein warping the composite image comprises repositioning a presentation boundary of the scaled up background image based on orientation data of the virtual reality headset.

16. The computer system of claim 13, wherein the operations of the end user device further comprise sending, to the remote computer, the gaze data of the user and orientation data of the end user device, wherein remote computer comprises second memory storing second instructions that, upon execution on the remote computer, configure the remote computer to perform second operations comprising:
rendering the background image based on the orientation data;
rendering the foreground image based on the gaze data; and
sending the background image and the foreground image to the end user device.

17. The computer system of claim 16, wherein warping the composite image comprises repositioning a presentation boundary of the scaled up background image based on updated orientation data of the end user device.

18. The computer system of claim 13, wherein generating the composite image further comprises:
blending an internal region of the scaled up background image and a boundary region of the overlaid foreground image, wherein the internal region and the boundary region are overlapping.

* * * * *